No. 867,275.
PATENTED OCT. 1, 1907.
H. S. HUNTER.
INSERTED TOOTH MILLING SAW.
APPLICATION FILED MAY 7, 1906.
Fig. 2.
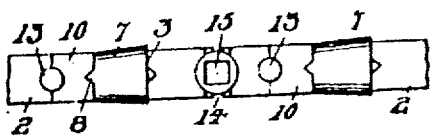
Fig. 1.
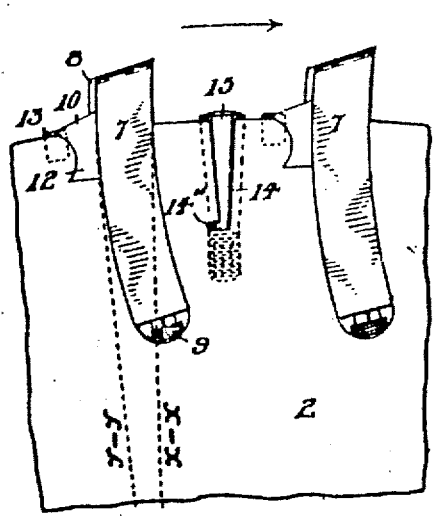
Fig. 3.
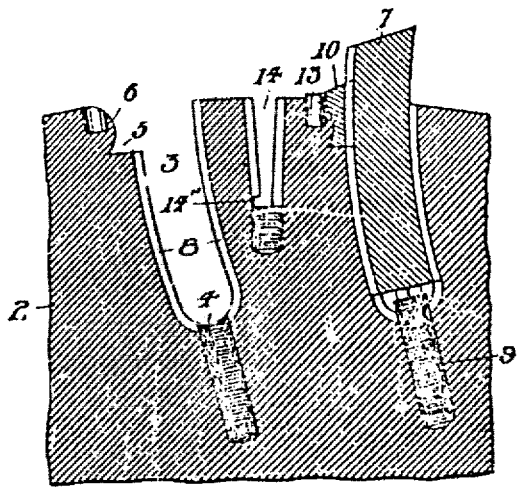
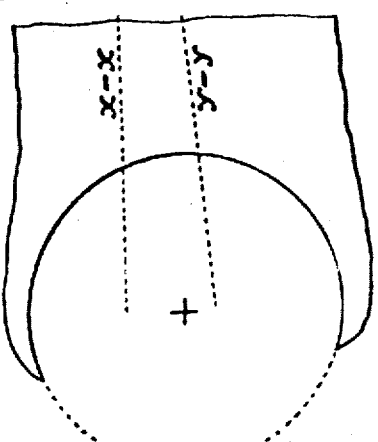
Fig. 4.
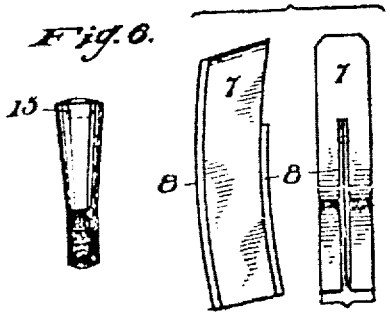
Fig. 6.
Fig. 5.
Witnesses:
J. P. Appleman
Vinnie M. Myers
Inventor
H. S. Hunter

UNITED STATES PATENT OFFICE.

HARRY S. HUNTER, OF ASPINWALL, PENNSYLVANIA.

INSERTED-TOOTH MILLING-SAW.

No. 867,275.

Specification of Letters Patent.

Patented Oct. 1, 1907.

Application filed May 7, 1906. Serial No. 315,509.

*To all whom it may concern:*

Be it known that I, HARRY S. HUNTER, a citizen of the United States, residing at Aspinwall, in the county of Allegheny and State of Pennsylvania, have invented certain new and useful Improvements in Inserted-Tooth Milling-Saws, of which the following is a specification, reference being had therein to the accompanying drawing.

This invention has particular reference to milling saws having inserted teeth, and one object is to provide a reinforcement at the rear of each tooth which communicates the strains to the blade or body in such manner that the latter is preserved from injury. As the teeth are formed of tool-steel, the softer metal of the blade is liable to give way under the excessive strains to which the teeth are subjected, and as the rear faces of the tooth-sockets receive the greatest stress, it is there that I apply the improved reinforcements.

A further object is to provide novel means for causing the metal of the blade to expand between the teeth and securely clamp them in their sockets.

Still a further object is to arrange the teeth with reference to the center of the blade in such manner that the strains communicated to the blade operate to increase the tooth-clamping efficiency of the sockets rather than to stretch them and to loosen or release the teeth.

In the accompanying drawing, Figure 1 is a view of a portion of a milling saw equipped with my improvements, two teeth being shown. Fig. 2 is an edge view.
Fig. 3 is a longitudinal sectional view, the tooth being removed from one of the sockets, also the tooth-clamping wedge. Fig. 4 illustrates one of the teeth in detail, and Fig. 5 similarly illustrates one of the reinforcing devices. Fig. 6 is a view of the taper-pin.

Referring to the drawings, 2 designates the blade or body of a milling saw having its periphery recessed from face to face to form tooth-sockets 3 which are curved forwardly or in the direction of movement of the saw, as indicated by the arrow, Fig. 1. At the base of each socket is a threaded screw-cavity 4, and the outer end of the rear wall of each cavity is cut away or recessed, as indicated at 5, the recess having the convex back edge or wall 6 which merges into the blade periphery.

Fitting each of sockets 3 is a correspondingly curved tooth or milling cutter 7, having tongues 8 on its edges which fit grooves 8' in the front and rear walls of the socket. The inner end of the tooth rests on screw 9 adjustable in threaded opening 4, and by this means the projection of the tooth is determined and the teeth made uniform. As the teeth wear or are ground off these screws may be adjusted to hold them projected as required.

Fitting socket-enlargement 5 is the reinforcing block 10 having one edge curved to engage the back of the tooth and notched at 11 to embrace the tooth-tongue 8, while its opposite edge is of concave form, as indicated at 12, to embrace the convex wall 6 of the socket-enlargement. A key 13 having its socket formed partly in the blade and partly in the edge of block 10 operates in conjunction with rib 8 and groove 11 to hold the block in place. Block 10 is preferably somewhat longer than the cavity in which it fits, and thus provides a solid backing for part of the projected portion of the tooth.

With milling saws as ordinarily constructed, no provision is made for so communicating the strains from the teeth to the blade as to prevent the tooth-sockets, and particularly the rear walls thereof, from being enlarged or fractured when the strains are excessive. When thus damaged the teeth are either insecurely held or the blade is rendered totally unserviceable and a new one must be provided. As the blade or body is formed of softer steel than the teeth, the reason for this trouble will be readily understood. With the back of each tooth reinforced as here shown, the principal part of the stress is communicated through block 10 and to the curved face 6 of the socket enlargement, and owing to this formation which materially increases the areas and consequently the resistance of the engaging surfaces of the teeth and reinforcements, there is practically no danger of fracture, however great the pressure and the consequent gripping embrace of said curved surface by the reinforcing block.

The inserted teeth are preferably secured in the sockets by expanding the blade in such manner as to contract the sockets, and for this purpose the blade is formed between adjacent sockets with an inwardly tapering recess 14 adapted to receive taper pin 15, the inner end of the recess having threaded socket 14' to receive the threaded inner end of the pin. To increase the flexibility of the blade one wall of recess 14 has the lateral incision 14'', and this incision is preferably formed in the wall adjacent the front or convex wall of socket 3, so that most of the spring of the metal resulting from the wedging is toward that socket, and hence has more of a wedging and holding action on the teeth therein than on the tooth on the other side of the pin. Thus, in the preferred adaptation, each tooth is reinforced at the back, and receives its principal clamping and holding pressure at the front. It will be understood however that each taper-pin may exert more or less clamping pressure in the other direction, or upon the back of the adjacent tooth.

The teeth are preferably of arcuate form, as thereby I procure the rake that is most effective, and at the same time am enabled to communicate the strains to the blade or body in such manner as not to have a tendency to loosen the teeth by stretching the sockets. To this end, the tooth-sockets are so formed that each socket, when viewed in upright position, or at the top of the blade, curves inwardly and forwardly in the direction in which the blade moves, the radius thereof being struck from such a center that a line intersecting the cutting edge a of the tooth and the juncture b of the front of the tooth and the edge or periphery of blade 2 will, when extended inward, pass to the rear of the blade center, such a line being indicated at X—X, Fig. 1. At the same time, a line extending from the juncture of the back of the tooth with the plane of the periphery of the blade will, when extended inward, pass in front of the blade center without encroaching upon the socket-confined portion of the tooth. This line is indicated at Y—Y, Fig. 1.

With the tooth-sockets thus disposed, the strains from the teeth are transmitted in a backward or inward direction into the body of the blade, as distinguished from strain lines which in sockets of different formation would run off or outward from the blade-edge or periphery close to the teeth. With the strains distributed throughout the blade-body instead of being confined, in the main, to the outer portion of the blade, the blade is rendered more serviceable and less liable to fracture. Also, when constructed as described, the strains operate to contract rather than stretch the teeth-confining cavities, and thus materially augment the holding or clamping pressure.

I claim:—

1. In a milling saw, a blade having a series of tooth-sockets, teeth for the sockets, a reinforcing device in each socket against which the back of the tooth therein bears, the blade having an opening in front of each tooth socket, and a securing device fitting said opening and operating to force the front wall of the socket against the tooth and clamp the latter and the reinforcing device.

2. In a milling saw, a circular blade having a series of arcuate tooth-sockets extending inward from its periphery with the concave of the sockets facing the direction of motion of the saw, teeth fitting the sockets and projecting therefrom, the arcuate sockets being so disposed that a line from the juncture of the rear side of the tooth and the blade periphery will, when projected inward, pass in front of the blade center without extending over the tooth.

3. In a milling saw, a blade having tooth-sockets, the outer portion of the rear side of each socket being enlarged, a tooth fitting the inner unenlarged portion of the socket and projecting therefrom, and a tooth-reinforcement fitting the socket enlargement and bearing against the rear edge of the tooth.

4. In a milling saw, a blade having tooth-sockets, the rear side of each socket being enlarged with the wall of the enlargement curved convexly, a tooth in the socket, and a tooth-reinforcement corresponding in shape to and fitting the socket-enlargement and against which the back of the tooth bears.

5. In a milling saw, a blade having tooth-sockets, teeth and reinforcing devices therein, each reinforcing device having fixed position in the socket with means for maintaining it in that position, and means for contracting the socket walls for clamping the tooth and reinforcing device.

6. In a milling saw, a blade having tooth-sockets, teeth and reinforcing devices therein, each socket and reinforcing device interlocking to prevent movement of said device longitudinally of the tooth, and means for contracting the socket walls for clamping the tooth and reinforcing device.

7. In a milling saw, a blade having its edge recessed inwardly from one face to the other to form a tooth-socket, the rear portion of the socket being enlarged, a tooth within the socket, a tooth-reinforcement fitting the socket-enlargement and against which the back edge of the tooth bears, means for securing the tooth, the engaging edges of the tooth-reinforcement and the wall of the socket-enlargement having a key-opening, and a key in said opening.

8. In a milling saw, a circular blade having a series of curved tooth-sockets, curved teeth complementary with and fitting the sockets and projecting therefrom, the convex edges of the teeth facing the direction of motion of the blade, the curvature of each edge being such that when in upright position a line intersecting the cutting extremity of the tooth and the juncture of the front edge of the tooth with the blade-edge will when extended inward pass to the rear of the blade center, and a line from the rear edge of the tooth in the plane of the blade-edge will when projected inward pass in front of the blade-center without extending over the tooth.

In testimony whereof I affix my signature in presence of two witnesses.

HARRY S. HUNTER.

Witnesses:
J. M. NESBIT,
ALEX. S. MADDOX.